UNITED STATES PATENT OFFICE 2,229,311

CEMENT COMPOSITION

Edward W. Scripture, Jr., Shaker Heights, Ohio, assignor to Dewey and Almy Chemical Company, Cambridge, Mass., a corporation of Massachusetts No Drawing. Application June 7, 1940,
Serial No. 339,393

10 Claims. (Cl. 106—27)

This invention relates to the hardening and waterproofing of concrete or mortar and has for its object to provide an indurating composition which will increase the strength, hardness and waterproofing qualities of concrete, and which will also increase the fluidity of a mix containing a given amount of water whereby less water is required to impart the necessary plasticity to the mix.

It is well known that the properties of concrete are influenced by the amount of water employed in the mix. A certain quantity of water is required in order that the cement, sand, gravel or other ingredients of the mix can be properly mixed together, so that the material will flow readily and can be worked satisfactorily, but it has been found that the water content of the mix should be kept as low as possible as the strength and density of the finished concrete is reduced by an increase in the water content.

It is an object of the present invention to provide means to increase the fluidity of a mix of concrete without increasing the amount of water employed in the mix.

A further object of the invention is to provide means to produce a concrete mix having a given degree of fluidity while employing a substantially smaller quantity of water than has heretofore been required to secure this degree of fluidity.

Another object of the invention is to provide an improved concrete which can be worked easily and readily, and which shrinks less in hardening than the concrete now employed, and which, when hardened, is denser and less permeable than the concrete now in use.

A further object of the invention is to provide a plasticizing agent which can be added to a batch of concrete or the like as it is being mixed, or to one of the ingredients before the material is mixed, and which will increase the fluidity of the mix compared to that of a similar mix prepared without the plasticizing agent.

Other objects of the invention and features of the invention will be apparent from the following description.

I have found, as set forth in my co-pending application Serial No. 751,747, filed November 6, 1934, that the plasticity or fluidity of a mix of concrete is greatly increased by the presence of a small quantity of certain water-soluble organic, dispersing agents, especially those of a group of extracts or compounds obtained from wood and particularly the waste product from the decomposition of wood in the manufacture of paper, known in the art as cellulose waste liquor. In my co-pending application Serial No. 59,603, filed January 17, 1936, patented August 16, 1938, No. 2,127,451, I have found that the combination of the dried residue from neutralized sulphite waste liquor in combination with finely divided pozzuolanic or inert solids has an especially beneficial action on concrete mixes, and in my co-pending application Serial No. 62,297, filed February 4, 1936, patented May 25, 1937, No. 2,081,642, that either the dried residue from sulphite waste liquor or the liquor itself may be used to even greater advantage when combined with certain agents which accelerate the set of cement.

The composition of sulphite waste liquor and also of the liquor obtained in the sulphate process for the treatment of wood in the manufacture of paper, is quite complex, but consists essentially of various decomposition products of cellulose, lignins, sulphonation products of lignin or the lignin sulphonic acids, various carbohydrates and free sulphurous acid or in the case of the sulphate treatment, sodium sulphate. While I have found that very effective results may be produced in concrete with the waste liquor as a whole, either in the liquid form or as a dried residue, either alone, in certain proportions, or in combination with other materials as set forth in my co-pending applications previously cited, for some purposes I have found that more satisfactory results are produced by treatment of the waste liquors either to modify them or to separate them into various portions.

I have treated the waste liquors with alkaline earth compounds, such as barium chloride, barium hydroxide and barium peroxide or such as calcium chloride, whereby the sulphate compounds in the waste liquor were converted to the insoluble barium sulphate or to the difficultly soluble calcium sulphate and when the hydroxide or oxide were used the liquor was partially or completely neutralized. The reaction may be more readily effected by heating the solution with the addition of a smaller quantity of the barium or calcium compounds. The amount of alkaline earth compound used should not be substantially in excess of that required to react with the waste liquor. In other words, the soluble alkaline earth compound is added in such amount that substantially no alkaline earth compound capable of accelerating the set of concrete remains after reaction. I have used the treated waste liquors either as a whole, using both the precipitate and the supernatant liquid, or I have used the liquid alone after filtering or the precipitate alone. As an illustration of this process and the effects therein obtainable, the following examples are given:

*Example I.*—100 c. c. of a sulphite waste liquor containing 11.1% solids was treated with 1.5 grams of barium hydroxide and filtered, designating the filtrate as Filtrate No. 1. This filtrate was again treated with 1.59 barium hydroxide and filtered, designating the second filtrate as Filtrate No. 2. Mortars were made up of 1100 g. Portland cement and 3300 g. Standard Ottawa sand. To one mortar no addition was made, to another 12 c. c. of Filtrate No. 1 was added and to a third 12 c. c. of Filtrate No. 2 was added. The first of these required 500 c. c. of water to bring it to a workable consistency, the second 445 c. c. and the third 450 c. c. to bring them to the same consistency. Compressive strength tests made according to standard procedure gave results as follows:

|  | Compressive strength, lbs./sq. in. | | |
| --- | --- | --- | --- |
|  | 3 days | 7 days | 28 days |
| No addition | 1815 | 2800 | 4262 |
| Filtrate No. 1 added | 2195 | 3120 | 4612 |
| Filtrate No. 2 added | 1877 | 3215 | 5120 |

*Example II.*—To 100 c. c. of sulphite waste liquor containing 11.1% solids was boiled and 2.25 g. barium hydroxide were added. Mortars consisting of 100 g. Portland cement and 3300 g. Standard Ottawa sand were made up and to one of these no additions were made; to the other was added 12.5 c. c. of the above treated waste liquor. The first required 500 c. c. of water to bring it to a workable consistency, whereas the second required only 425 c. c. of water to bring it to the same consistency. Compressive strength tests made according to standard practice gave results as follows:

|  | Compressive strength, lbs./sq. in. | | |
| --- | --- | --- | --- |
|  | 3 days | 7 days | 28 days |
| No addition | 1973 | 3215 | 4424 |
| 12.5 c. c. treated waste liquors | 2005 | 3215 | 4775 |

*Example III.*—To 100 c. c. of waste liquor from the sulphate process containing 57.2% solids was added 120 g. barium hydroxide and 300 c. c water and the resulting liquid was filtered. 3 c. c. of the filtrate was added to a mortar consisting of 1100 g. cement and 3300 g. Standard Ottawa sand. With this addition the mortar required 20 c. c. less water to bring it to a workable consistency than was required to bring a similar mortar without the addition to the same consistency. Compressive strength on these two mortars were:

|  | Compressive strength, lbs./sq. in. | | |
| --- | --- | --- | --- |
|  | 3 days | 7 days | 28 days |
| No addition | 1590 | 2926 | 4548 |
| Treated waste liquor added | 1814 | 3022 | 4962 |

By chemical processes well known in the art it is possible to separate from sulphite waste liquor various compounds contained therein in a more or less pure state. These include soluble lignin sulphonic acid salts of practically all metals in liquid or dry form, insoluble lignin sulphonic acid salts of various metals in solid form or as alkaline dispersions, free lignin sulphonic acid and derivatives thereof in liquid or dry form, lignin derivatives free from sulphonic acid and the residual carbohydrates remaining after the removal of the lignin material, and derivatives thereof. I have found that these compounds are effective in increasing plasticity and in decreasing the amount of water required in a concrete mix and that whereas some of the fractions have a greater effect in decreasing the water required for a given consistency, others having a smaller effect on fluidity are more advantageous with respect to their effect on the strength of concrete. Therefore, in some cases I may use one and in some cases I may use another of these fractions depending on the specific effect which it is desired to attain in a particular case.

As illustrations of my process I give the following examples:

1. Two mortars were made up of 1 part by weight of Portland cement and 3 parts by weight of Standard Ottawa sand and water to give a workable consistency. To one of these mortars was added .05% on the weight of the cement of lignin sulphonic acid and in this mortar 7% less water was required than in the mix without this addition to attain the same consistency. The compressive strength of these two mortars were as follows:

|  | Compressive strength, lbs./sq. in. | | |
| --- | --- | --- | --- |
|  | 3 days | 7 days | 28 days |
| No addition | 1465 | 2640 | 4676 |
| .05% lignin sulphonic acid | 1750 | 2926 | 5184 |

II. Two mortars were made up of 1 part by weight of Portland cement and 3 parts by weight of Standard Ottawa sand. To one of these was added 0.15% on the weight of the cement of the calcium salt of lignin sulphonic acid. Both mortars were made up with sufficient water to bring them to the same consistency and it was found that the mortar containing the calcium salt of lignin sulphonic acid required 10% less water. The compressive strength of these mortars were:

|  | Compressive strength, lbs./sq. in. | | |
| --- | --- | --- | --- |
|  | 3 days | 7 days | 28 days |
| No addition | 1846 | 3308 | 4676 |
| 0.15% calcium lignin sulphonic acid | 1972 | 3340 | 4644 |

*Example III.*—Two mortars were made up of 1 part by weight of Portland cement and 3 parts by weight Standard Ottawa sand. To one of these was added 0.5% on the weight of the cement of the liquid solution of carbohydrates remaining after the removal of the lignin compounds from the waste liquor. Both mortars were made up to the same consistency with water, and it was found that the mortar with the above carbohydrate addition required 14% less water. The compressive strength of these mortars were:

|   | Compressive strength, lbs./sq. in. | | |
|---|---|---|---|
|   | 3 days | 7 days | 28 days |
| No addition | 1846 | 3308 | 4676 |
| 0.5% carbohydrate solution | 2068 | 3658 | 5375 |

It will be obvious that other materials may be added to the concrete at the same time as, for example, accelerators, waterproofings, colors, finely divided inert or pozzuolanic solids, or other materials. These may be added separately to the concrete mix at the time of mixing or might be added to the dispersing agent prior to the mixing of the concrete. It will also be obvious that the dispersing agent may be added to the concrete when it is being mixed, or to each sack of cement before the mix is being made or, if in dry form, to the cement when it is ground, or in fact to any part of the concrete prior to the addition of water.

In using the treated waste sulphite liquor or any of the fractions or products thereof obtained by chemical treatment of the liquor as above described as a plasticizing agent the amount of the agent used should be substantially equivalent to the amount of the fraction or product obtainable from an amount of dried sulphite liquor residue equal to from .05% to .5% by weight of the cement.

It is to be understood that the particular compounds disclosed and the procedure set forth are presented for purposes of explanation and illustration, and that various equivalents can be used and modifications of the said procedure can be made without departing from my invention as defined in the appended claims.

The present application is a continuation-in-part of my prior application Serial No. 103,412, filed September 30, 1936.

What I claim is:

I claim:

1. A cement composition comprising a mixture of cement and cellulose waste liquor modified by precipitation of sulphate ions therefrom through addition of a soluble alkaline earth compound in such amount that substantially no alkaline earth compound capable of accelerating the set of concrete remains after reaction.

2. A plasticizing and indurating composition for use in the making of concrete comprising cellulose waste liquor modified by the addition of such an amount of a soluble alkaline earth compound as to remove sulphate ions therefrom by precipitation of alkaline earth sulphates without leaving any substantial excess of alkaline earth compound capable of accelerating the set of concrete.

3. The process of making concrete which comprises adding to cement carbohydrates separated from the filtrate derived from cellulose waste liquor from which sulphate ions have been removed by precipitation with an alkaline earth compound in such an amount that substantially no soluble alkaline earth compound capable of accelerating the set of concrete remains after reaction.

4. The process of making concrete which comprises adding to cement the filtrate derived from cellulose waste liquor from which sulphate ions have been removed by precipitation with an alkaline earth compound in such an amount that substantially no soluble alkaline earth compound capable of accelerating the set of concrete remains after reaction.

5. A plasticizing and indurating composition for use in the making of concrete comprising the filtrate derived from cellulose waste liquor from which sulphate ions have been removed by precipitation with an alkaline earth compound in such an amount that substantially no soluble alkaline earth compound capable of accelerating the set of concrete remains after reaction.

6. A plasticizing and indurating composition for use in the making of concrete comprising the dried filtrate derived from cellulose waste liquor from which sulphate ions have been removed by precipitation with an alkaline earth compound in such an amount that substantially no soluble alkaline earth compound capable of accelerating the set of concrete remains after reaction.

7. A cement composition comprising a mixture of cement and the dried filtrate derived from cellulose waste liquor from which sulphate ions have been removed by precipitation with an alkaline earth compound in such an amount that substantially no soluble alkaline earth compound capable of accelerating the set of concrete remains after reaction.

8. The process of making concrete which comprises treatment of cellulose waste liquor to precipitate sulphate ions therefrom through addition of a soluble alkaline earth compound in such amount that substantially no alkaline earth compound capable of accelerating the set of concrete remains after reaction and adding the treated liquor to cement in an amount substantially equivalent to the amount of the product obtainable from an amount of dried cellulose waste liquor residue equal to from 0.05% to 0.5% by weight of the cement.

9. A cement composition comprising a mixture of cement and cellulose waste liquor modified by precipitation of sulphate ions therefrom through addition of a soluble alkaline earth compound in such amount that substantially no alkaline earth compound capable of accelerating the set of concrete remains after reaction, the modified cellulose waste liquor being present in an amount substantially equivalent to the amount of the product obtainable from an amount of cellulose waste liquor residue equal to from 0.05% to 0.5% by weight of the cement.

10. The process of making concrete which comprises adding to cement a modified cellulose waste liquor which has been treated with an alkaline earth compound in such an amount as to remove sulphate ions therefrom by precipitation of alkaline earth sulphates without leaving any substantial excess of soluble alkaline earth compound capable of accelerating the set of concrete.

EDWARD W. SCRIPTURE, Jr.